US012659422B2

(12) United States Patent
Yang et al.

(10) Patent No.: US 12,659,422 B2
(45) Date of Patent: Jun. 16, 2026

(54) METHOD AND APPARATUS FOR PROCESSING VIDEO DATA, COMPUTER DEVICE, AND STORAGE MEDIUM

(71) Applicant: TENCENT TECHNOLOGY (SHENZHEN) COMPANY LIMITED, Shenzhen (CN)

(72) Inventors: Xueying Yang, Shenzhen (CN); Jinlong Bao, Shenzhen (CN); Shichuan Liu, Shenzhen (CN); Zhengtong Li, Shenzhen (CN); Zhaowu Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/915,488

(22) Filed: Oct. 15, 2024

(65) Prior Publication Data

US 2025/0039330 A1 Jan. 30, 2025

Related U.S. Application Data

(63) Continuation of application No. PCT/CN2023/126236, filed on Oct. 24, 2023.

(30) Foreign Application Priority Data

Dec. 9, 2022 (CN) .......................... 202211589458.6

(51) Int. Cl.
*H04N 7/01* (2006.01)
*G06T 7/40* (2017.01)
(Continued)

(52) U.S. Cl.
CPC ............. *H04N 7/0117* (2013.01); *G06T 7/40* (2013.01); *G06T 7/90* (2017.01); *G06V 10/60* (2022.01); *G06T 2207/10024* (2013.01)

(58) Field of Classification Search
CPC ......... H04N 7/0117; H04N 21/440263; H04N 21/44; H04N 21/234; G06T 7/40;
(Continued)

(56) References Cited

U.S. PATENT DOCUMENTS

2005/0231504 A1* 10/2005 Heng ...................... G06T 15/40
345/582
2008/0205518 A1* 8/2008 Wilinski ................ H04N 19/46
375/E7.129
(Continued)

FOREIGN PATENT DOCUMENTS

CN 110223228 A 9/2019
CN 110868625 A 3/2020
(Continued)

OTHER PUBLICATIONS

The World Intellectual Property Organization (WIPO) International Search Report for PCT/CN2023/126236 Jan. 20, 2024 5 Pages (including translation).
(Continued)

*Primary Examiner* — Michael E Teitelbaum
(74) *Attorney, Agent, or Firm* — Anova Law Group, PLLC

(57) ABSTRACT

A video data processing method includes receiving compressed video data that has first resolution, obtaining first texture data having the first resolution based on one or more first video frames in the compressed video data, generating second texture data having second resolution higher than the first resolution based on the first texture data, and generating one or more second video frames having the second resolution through a rendering operation and based on the second texture data.

18 Claims, 9 Drawing Sheets

30

S301 — Receive compressed video data, the compressed video data having first resolution S302 — Obtain, based on one or more video frames in the compressed video data, texture data having the first resolution S303 — Generate, based on the texture data having the first resolution, texture data having second resolution, the second resolution being higher than the first resolution S304 — Generate, based on the texture data having the second resolution, one or more video frames having the second resolution through a rendering operation

(51) Int. Cl.
   *G06T 7/90*        (2017.01)
   *G06V 10/60*        (2022.01)
(58) Field of Classification Search
   CPC ............. G06T 7/90; G06T 2207/10024; G06T
                3/4053; G06V 10/60
   See application file for complete search history.

(56)            References Cited

U.S. PATENT DOCUMENTS

2016/0316169 A1 * 10/2016  Eguchi ............... H04N 21/4316
2020/0193566 A1     6/2020  Croxford
2021/0044693 A1 *  2/2021  Yu ..................... H04M 1/72463
2021/0312592 A1    10/2021  Liu et al.

FOREIGN PATENT DOCUMENTS

CN          114501141 A     5/2022
CN          114746902 A     7/2022
WO        2022073816 A1     4/2022

OTHER PUBLICATIONS

The European Patent Office (EPO) The Extended European Search
Report for Application No. 23899612.8 Dec. 1, 2025 10 Pages.

* cited by examiner

100

30

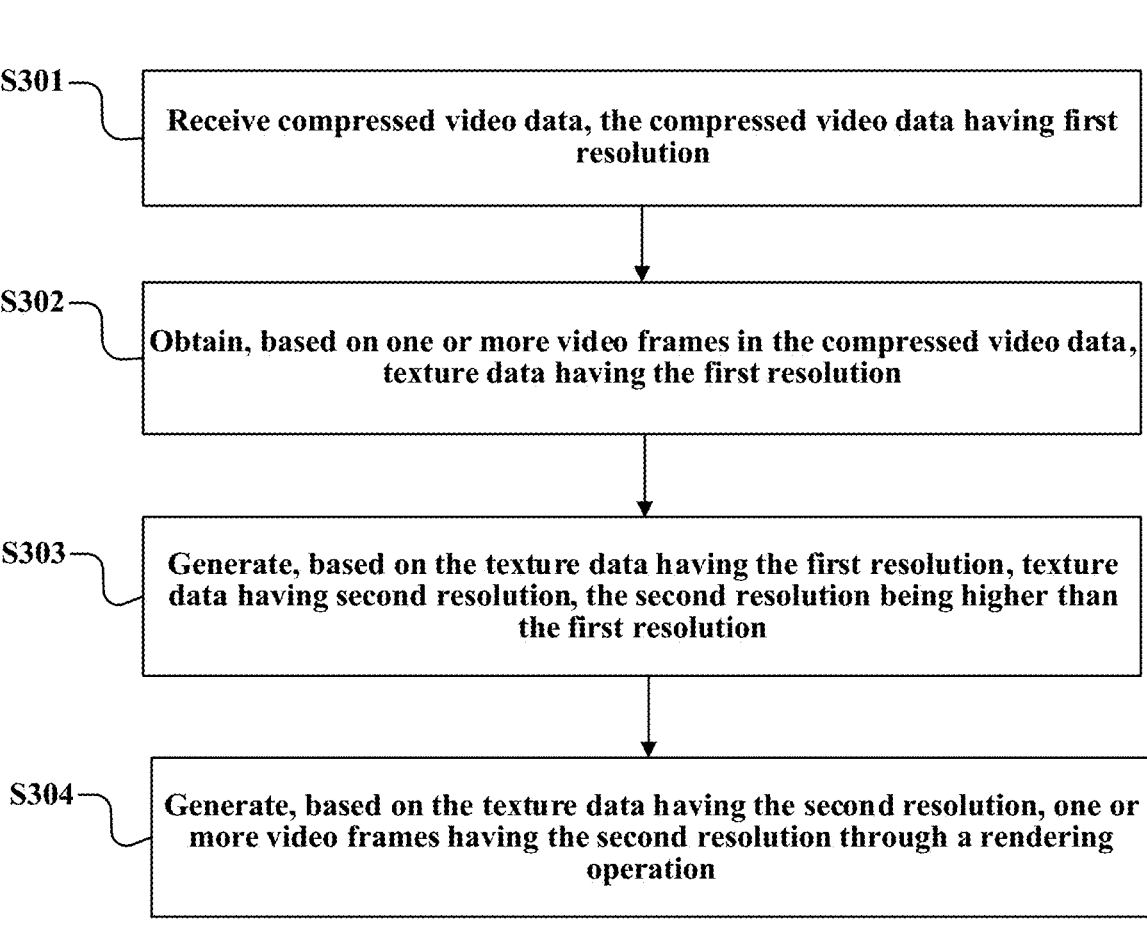

S301

Receive compressed video data, the compressed video data having first resolution

S302

Obtain, based on one or more video frames in the compressed video data, texture data having the first resolution

S303

Generate, based on the texture data having the first resolution, texture data having second resolution, the second resolution being higher than the first resolution

S304

Generate, based on the texture data having the second resolution, one or more video frames having the second resolution through a rendering operation

FIG. 3

METHOD AND APPARATUS FOR PROCESSING VIDEO DATA, COMPUTER DEVICE, AND STORAGE MEDIUM

CROSS-REFERENCE TO RELATED APPLICATIONS

This application is a continuation of International Application No. PCT/CN2023/126236, filed on Oct. 24, 2023, which claims priority to Chinese Patent Application No. 202211589458.6, filed on Dec. 9, 2022 and entitled "METHOD AND APPARATUS FOR PROCESSING VIDEO DATA," the entire contents of both of which are incorporated herein by reference.

FIELD OF THE TECHNOLOGY

The present disclosure relates to the field of cloud technologies, and in particular, to a method and an apparatus for processing video data, a computer device, and a storage medium.

BACKGROUND OF THE DISCLOSURE

Super-resolution (SR) technologies have a wide range of practical applications, such as medical image reconstruction, facial image reconstruction, ultra-high-definition television, and ultra-high-definition video playback. For a video application, the super-resolution technology can improve resolution of one or more frames in an original video by using a hardware or software method, to reconstruct a low-resolution video into a high-resolution video.

However, the existing super-resolution technology has high storage costs, large computational load, and a time-consuming algorithm, resulting in video stuttering when a mobile terminal using the super-resolution technology plays a real-time video.

SUMMARY

In accordance with the disclosure, there is provided a video data processing method including receiving compressed video data that has first resolution, obtaining first texture data having the first resolution based on one or more first video frames in the compressed video data, generating second texture data having second resolution higher than the first resolution based on the first texture data, and generating one or more second video frames having the second resolution through a rendering operation and based on the second texture data.

Also in accordance with the disclosure, there is provided a computer device including one or more processors, and one or more memories storing one or more computer-executable programs that, when executed by the one or more processors, cause the computer device to receive compressed video data that has first resolution, obtain first texture data having the first resolution based on one or more first video frames in the compressed video data, generate second texture data having second resolution higher than the first resolution based on the first texture data, and generate one or more second video frames having the second resolution through a rendering operation and based on the second texture data.

Also in accordance with the disclosure, there is provided a non-transitory computer-readable storage medium storing one or more computer-executable instructions that, when executed by one or more processors of a computer device, cause the computer device to receive compressed video data that has first resolution, obtain first texture data having the first resolution based on one or more first video frames in the compressed video data, generate second texture data having second resolution higher than the first resolution based on the first texture data, and generate one or more second video frames having the second resolution through a rendering operation and based on the second texture data.

BRIEF DESCRIPTION OF THE DRAWINGS

Accompanying drawings described herein are intended to provide further understanding of the present disclosure and constitute a part of the present disclosure. Exemplary embodiments of the present disclosure and the description thereof are configured for explaining the present disclosure rather than constituting the improper limitation to the present disclosure.

FIG. 3 is a flowchart of a method for processing video data according to an embodiment of the present disclosure.

DESCRIPTION OF EMBODIMENTS

Figure 1:
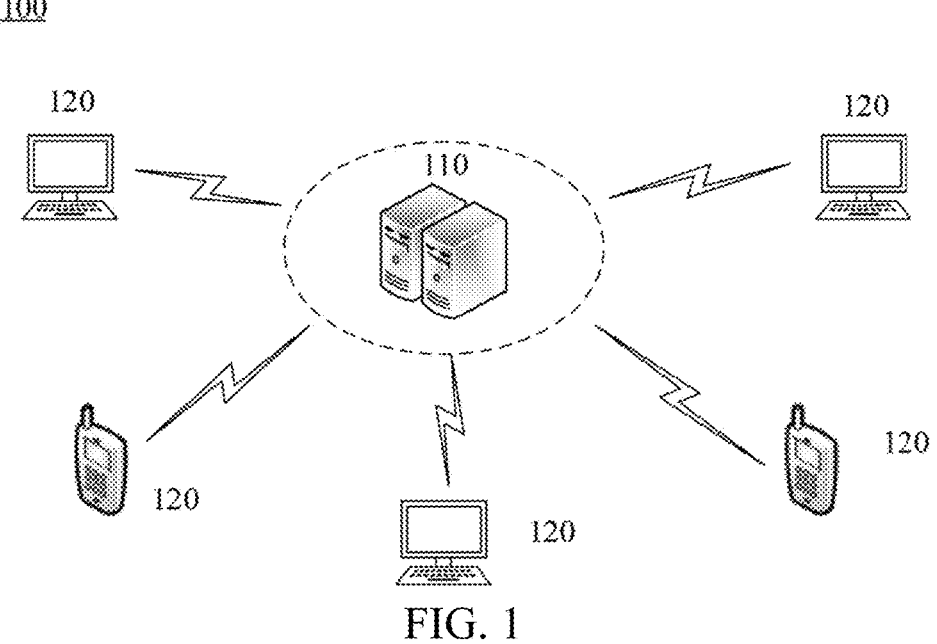
FIG. 1 is a schematic diagram showing an application scenario according to an embodiment of the present disclosure.

To make objectives, technical solutions, and advantages of the present disclosure more apparent, the following further describes in detail exemplary embodiments of the present disclosure with reference to the accompanying drawings. Apparently, the described embodiments are merely some embodiments of this application rather than all embodiments of the present disclosure. The present disclosure is not limited by the exemplary embodiments described herein.

In this specification and the accompanying drawings, substantially same or similar operations and elements are indicated by same or similar reference numerals, and repeated descriptions of the operations and elements are omitted. In addition, terms such as "first" and "second," and "third" in the descriptions of the present disclosure are intended to distinguish between same or similar items with substantially same roles and functions. There is no logical or timing dependency relationship between terms "first," "second," and "$n^{th}$," and a quantity and an execution sequence are not limited. The terms such as "first" and "second" are used in the following descriptions for describing various elements, but the elements are not limited by the terms. The terms are merely intended to distinguish one element from another element. For example, first data may be referred to as second data, and similarly, the second data may be referred to as the first data without departing from a scope of various examples. Both the first data and the second data may be data, and in some cases, may be separate and different data. In this application, the term "at least one" means one or more, and the term "plurality of" means two or more. For example, a plurality of audio frames mean two or more audio frames.

Terms used in description of the various examples in this specification are merely for describing specific examples and are not intended to impose limitations. As used in the description of the various examples and the appended claims, singular forms, "a" or "an" and "the," are intended to also include plural forms, unless the context clearly indicates otherwise.

The term "and/or" used herein refers to and includes any and all possible combinations of one or more of associated listed items. The term "and/or" describes an association relationship between associated objects, and indicates that three relationships may exist. For example, A and/or B may indicate the following cases: Only A exists, both A and B exist, and only B exists. In addition, the character "/" in this application generally indicates an "or" relationship between the associated objects.

In the embodiments of this application, an order of sequence numbers of processes does not indicate an execution sequence, and execution sequences of the processes are to be determined based on functions and internal logic thereof and is not to impose any limitation on an implementation process of the embodiments of this application. Determining B according to (based on) A does not mean that B is only determined according to (based on) A, and B may also be determined according to (based on) A and/or other information.

Terms "includes," "including," "comprises" and/or "comprising," when used in this specification, specify presence of stated features, integers, operations, elements, and/or components, but do not preclude presence or addition of one or more other features, integers, operations, elements, components, and/or groups thereof.

The term "if" may be interpreted as a meaning of "when" or "upon," "in response to determining," or "in response to detecting." Similarly, according to the context, the phrase "if determining" or "if detecting (a stated condition or event)" may be interpreted as a meaning of "when determining . . . ," "in response to determining . . . ," "when detecting (a stated condition or event)," or "in response to detecting . . . (a stated condition or event)."

To facilitate description of the present disclosure, the following describes concepts related to the present disclosure.

Before the present disclosure is described in detail, to help understand the technical solutions of the present disclosure, terms to be used in the present disclosure are first explained below.

A cloud technology is a hosting technology that unifies a series of resources such as hardware, software, and a network in a wide area network or a local area network, to implement computation, storage, processing, and sharing of data. The cloud technology is a general term for a network technology, an information technology, an integration technology, a management platform technology, an application technology, and the like applied based on a cloud computing business mode, and may form a resource pool, which is used as required and is flexible and convenient. A cloud computing technology becomes an important support. A backend service of a technical network system requires a large number of computation and storage resources, such as a video website, a picture website, and more portal websites. With great development and application of the Internet industry, each article may have an identification mark in the future, and needs to be transmitted to a backend system for logic processing. Data at different levels is separately processed, and data in all industries needs a powerful system support, which can only be implemented through cloud computing.

Resolution generally refers to a capability of a measurement or display system to distinguish a detail, and indicates a capability to distinguish between two points or a line in a video frame. The resolution may also represent definition of an image. Higher resolution indicates better image quality, and more details can be shown. However, conversely, more recorded information indicates a larger file. Units describing the resolution include DPI (dots per inch), LPI (lines per inch), and PPI (pixels per inch). The PPI is a commonly used unit, and describes a ratio of a quantity of pixels per unit length to the unit length. The PPI is also referred to as pixel density. Higher pixel density indicates denser pixels. 5 PPI indicates 5 pixels per inch, and 500 PPI indicates 500 pixels per inch. A higher value of the PPI indicates higher definition of a picture and a video.

A convolutional neural network (CNN) is a type of feedforward neural network including convolutional computation and having a deep structure, and is one of representative algorithms of deep learning. The convolutional neural network has a representation learning capability, and can perform shift-invariant classification on input information based on a hierarchical structure thereof. Therefore, the convolutional neural network is also referred to as a "shift-invariant artificial neural network (SIANN)."

Currently, to enable a mobile terminal to play a high-resolution video, the industry usually processes a low-resolution video by using an offline super-resolution technology on a server side, to generate a high-resolution video, and deliver the high-resolution video to the mobile terminal. However, it is difficult to apply such a solution to a real-time video, and the video after super-resolution processing occupies more storage resources, resulting in an increase in storage costs on the server side. In addition, because delivering the high-resolution video occupies an excessive network bandwidth, network congestion and waste of network resources are also caused.

The industry further provides another solution: presetting a large number of neural network training models on the mobile terminal, and performing super-resolution processing on the low-resolution video on the mobile terminal by using a deep learning algorithm (for example, a CNN algorithm). However, the deep learning algorithm has high a requirement on sizes and quality of the model and an operator. In a scenario with a large model, the mobile terminal consumes excessive computing resources, resulting in stuttering when the mobile terminal plays the video.

Therefore, to make up for the foregoing shortcomings, the present disclosure provides a method and an apparatus for processing video data, a storage medium, and a computer device. The method includes: receiving compressed video data, the compressed video data having first resolution; obtaining, based on one or more video frames in the compressed video data, texture data having the first resolution; generating, based on the texture data having the first resolution, texture data having second resolution, the second resolution being higher than the first resolution; and generating, based on the texture data having the second resolution, one or more video frames having the second resolution through a rendering operation.

In the embodiments of the present disclosure, a video is compressed on a server side, and a video with small data volume and low definition is delivered, thereby reducing a network transmission bandwidth, and improving efficiency of transmitting the video. In addition, when a terminal plays the video, picture quality of the video is enhanced, a lightweight super-resolution (SR) algorithm is used, so that picture quality of the video is enhanced, video storage costs of a mobile terminal are reduced, and a video viewing effect is ensured.

FIG. 1 is a schematic diagram showing an application scenario 100 according to an embodiment of the present disclosure. A server 110 and a plurality of terminals 120 (for example, mobile terminals) are shown as examples. Video data may be stored on the mobile terminal 120 or the server 110, and the terminal and the server may be directly or indirectly connected in a wired or wireless communication manner, so that the video data can be transmitted between the mobile terminal 120 and the server 110.

The terminal 120 may be a smartphone, a tablet computer, a notebook computer, a desktop computer, a personal computer (PC), a smart speaker, a smart watch, or the like having a storage unit and a terminal installed with a microprocessor, but is not limited thereto. The server 110 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

The server 110 may process original video data by using various data compression technologies, to generate a compressed video. Compressed video data may be stored in smaller storage space, and transmitted using fewer network resources. After completing compression of the raw video data, the server 110 posts a storage address of the compressed video on the server on a portal site. Then, the server 110 transmits the compressed video to one or more terminals 120 according to a request of the terminal 120 for a video data service.

An application for playing a video is installed on the terminal 120, and the server 110 may be a backend server of an application deployed on the terminal, configured to perform interaction with the terminal running the application for playing the video, to provide computing and application service support to the terminal (or the application deployed on the terminal).

In an example, the application installed on the terminal 120 for playing the video may be a product integrated with audio and video communication capabilities, to provide audio and video and communication capabilities such as live broadcast, on demand, short videos, real-time audio and videos, and beauty effects on a plurality of platforms such as a mobile end, a PC end, a Web end, and an applet end. A module related to a super-resolution (SR) technology—may be integrated into a software development kit (SDK) supporting the foregoing functions, to implement an effect of one-time access and calling available everywhere. More specifically, the software development kit is a set of development kits used by some software engineers for building application software for a specific software package, a specific software framework, a specific hardware platform, a specific operating system, and the like.

For example, the module related to the super-resolution technology may be integrated into the application in a form of an SDK plug-in. The SDK plug-in serves as a program written through an application programming interface following a specific specification, and may simultaneously support the plurality of platforms (for example, an iOS platform or an Android platform) and call function libraries or data on the platforms, to convert the compressed video data from the server 110 side into high-definition video data.

Figure 2:
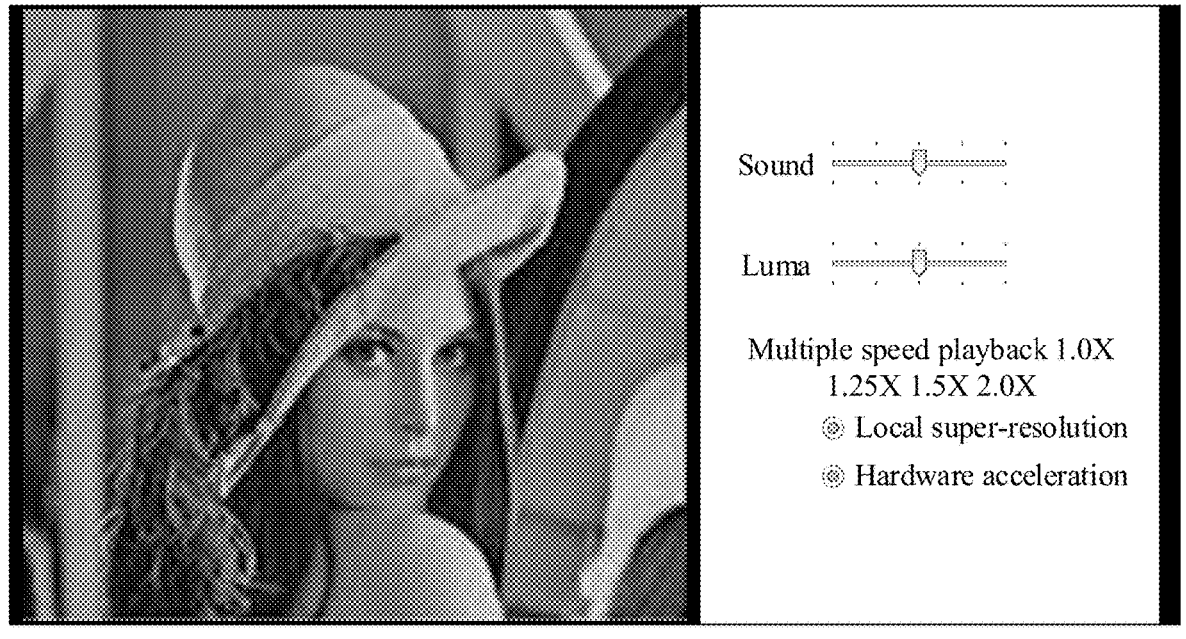
FIG. 2 shows a user interface according to an embodiment of the present disclosure.

As shown in FIG. 2, in a user interface of the terminal 120 for playing the video, a user may call the module related to the super-resolution technology deployed on the terminal 120 by tapping a "local super-resolution" button, to implement real-time conversion and playback of a low-definition video to a high-definition video by using a lightweight and efficient super-resolution technology according to the embodiments of the present disclosure.

The present disclosure provides a method for displaying video data, including: receiving compressed video data, the compressed video data having first resolution; displaying a button configured for controlling resolution of the video data; generating, in response to that the button configured for controlling the resolution of the video data is triggered, one or more video frames having second resolution based on the one or more video frames in the compressed video data, the second resolution being higher than the first resolution; and displaying the one or more video frames having the second resolution.

Correspondingly, the present disclosure further provides an apparatus for displaying video data, including: a receiver (receiving module), a processor, and a display, where the receiver is configured to receive compressed video data, the compressed video data having first resolution; the display is configured to display a button configured for controlling resolution of the video data at a first moment; the processor is configured to generate, in response to that the button configured for controlling the resolution of the video data is triggered, one or more video frames having second resolution based on the one or more video frames in the compressed video data, the second resolution being higher than the first resolution; and the display is further configured to display the one or more video frames having the second resolution at a second moment.

The present disclosure further provides a method for processing video data, including: receiving compressed video data, the compressed video data having first resolution; obtaining, based on one or more video frames in the compressed video data, texture data having the first resolution; generating, based on the texture data having the first resolution, texture data having second resolution, the second resolution being higher than the first resolution; and generating, based on the texture data having the second resolution, one or more video frames having the second resolution through a rendering operation.

Correspondingly, the present disclosure further provides an apparatus for processing video data, including: a receiving module, configured to receive compressed video data, the compressed video data having first resolution; an extraction module, configured to obtain, based on one or more video frames in the compressed video data, texture data having the first resolution; a super-resolution processing module, configured to generate, based on the texture data having the first resolution, texture data having second resolution, the second resolution being higher than the first resolution; and a rendering module, configured to generate, based on the texture data having the second resolution, one or more video frames having the second resolution through a rendering operation.

Compared with conventional technologies, in a super-resolution technology according to the embodiments of the present disclosure, a complex neural network model is abandoned, but a capability to decode the video data, a capability to extract and process the texture data, and a processing capability to render the video frame of software and hardware on a terminal are fully used, to complete real-time conversion and playback from a low-definition video to a high-definition video without consuming excessive computing resources of a CPU in a lightweight and efficiently manner.

A schematic diagram showing an application scenario shown in FIG. 1 and a video playback interface shown in FIG. 2 are merely examples. The application scenario and the video playback interface described in the embodiments of the present disclosure are for more clearly describing the technical solutions in the embodiments of the present disclosure, and do not constitute a limitation on the technical solutions provided in the embodiments of the present disclosure. A person of ordinary skill in the art may learn that, with evolution of a super-resolution technology and appearance of a new service scenario, the technical solutions provided in the embodiments of the present disclosure also apply to a similar technical problem.

The embodiments of the present disclosure are described in detail below with reference to FIG. 3 to FIG. 11.

Figure 4:
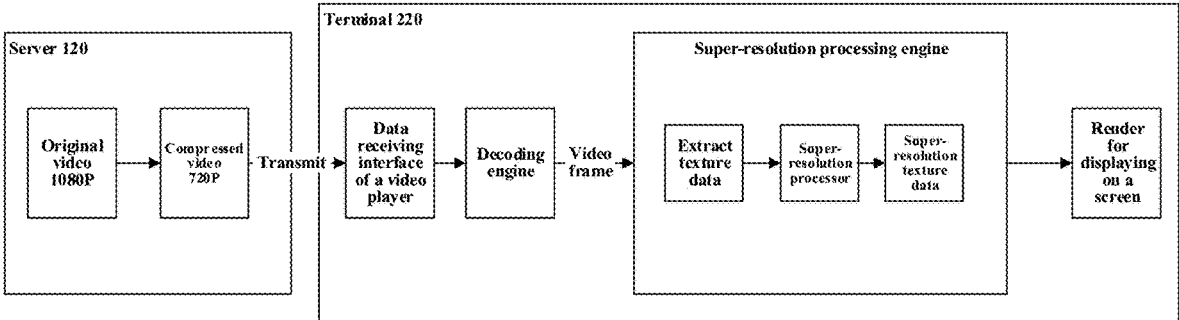
FIG. 4 is a diagram showing an architecture of an apparatus for processing video data according to an embodiment of the present disclosure.

FIG. 3 is a flowchart of a method 30 for processing video data according to an embodiment of the present disclosure. FIG. 4 is a diagram showing an architecture of an apparatus for implementing the method 30 according to an embodiment of the present disclosure.

As shown in FIG. 3, the method 30 includes the following operations S301 to S304. In an embodiment, the method 30 may be performed by the terminal 120 described in detail above. Certainly, the present disclosure is not limited thereto.

Operation S301: Receive compressed video data, the compressed video data having first resolution.

In an embodiment, referring to FIG. 4, the terminal 120 may receive the compressed video data from a server 110. In an example, original video data before compression may be video data in an MP4 or HLS format. For example, the original video data before compression may be original video data of 1080P (where resolution is 1920×1080), which indicates that a long edge of each video frame in the original video data includes 1920 pixels, and a short edge includes 1080 pixels. If the terminal 120 directly receives the original video data from the server 110, both the terminal 120 and the server 110 need to consume a large amount of storage and bandwidth costs. Therefore, the server 110 may compress the original video data of 1080P into video data of 720P with low definition and small data volume. Resolution of the video data of 720P is 1280×720, in other words, a long edge of each video frame in the compressed video data includes 1280 pixels, and a short edge includes 720 pixels. Although the definition of the compressed video data of 720P is low, corresponding data volume of the compressed video data is small, and only small storage and bandwidth costs need to be consumed.

In an example, as shown in FIG. 4, an application that is installed on the terminal 120 and configured to play a video may call a video player, to obtain the compressed video data from a receiver of the terminal 120 via a data receiving interface of the video player. For a real-time video playback scenario, the application that is installed on the terminal 120 and configured to play the video may further perform interaction with the receiver of the terminal 120, to obtain a video stream in real time and continuously transmit the video stream to the video player in real time by using a streaming technology. Next, an example in which the server 110 compresses the original video data is further described with reference to FIG. 5. Certainly, the present disclosure is not limited thereto.

Operation S302: Obtain, based on one or more video frames in the compressed video data, texture data having the first resolution.

For example, the video frame is a single image picture of a smallest unit in an image animation. A video frame is a still picture, and successive frames form an animation, for example, a television image. Each frame is a still image, and displaying a plurality of frames in rapid succession forms an illusion of motion. The video frame herein may be any one of an I frame, a P frame, and a B frame. The I frame may be an independent frame that can be independently decoded without referring to another image based on information carried on the I frame. The P frame may be an "inter-frame prediction coding frame," and can be decoded by referring to different parts of the I frame and/or the P frame. The B frame may be a "bidirectional prediction coding frame," and is decoded by using a previous frame and a next frame of the B frame as reference frames. Certainly, the present disclosure is not limited thereto.

In an example, as shown in FIG. 4, the compressed video data may be decapsulated and decoded through a decoding engine in the video player, to obtain the one or more video frames. In an exemplary implementation process, the decoding engine performs the following process: decapsulating the compressed video data into a video bitstream by using a central processing unit of the terminal; decoding the video bitstream into the one or more video frames by using a graphics processing unit of the terminal; and obtaining, based on the one or more video frames, the texture data having the first resolution. Certainly, the present disclosure is not limited thereto.

The decoding engine may be configured to decapsulate and decode the video data. An encapsulation format is also referred to as a container, and the compressed video data is encapsulated in the container. "Decapsulation" is a process of obtaining a video bitstream, an audio bitstream, subtitles, and metadata information from the "container." The process is usually processed by using the central processing unit (CPU) of the terminal.

"Decoding" includes hardware decoding and software decoding, and a role of decoding is to decode the bitstream into the one or more video frames (YUV data or RGB data). The video frames include a pixel value of each pixel point for displaying on a display of the terminal. "Hardware decoding" is processing the video data based on the graphics processing unit (GPU), and "software decoding" is processing the video data based on the central processing unit (CPU). For example, on an Android platform, the decoding engine may decapsulate the video data by using MediaExtractor, and perform hardware decoding on the decapsulated video data by using MediaCodec, to obtain the one or more video frames. In addition, on the Android, software decoding may also be performed on the decapsulated video data by using ffmpeg. As another example, on an iOS platform, the decoding engine may perform hardware decoding on the decapsulated video data by using VideoToolbox, or may perform software decoding on the decapsulated video data by using the ffmpeg. The following embodiments of the present disclosure are described in detail by using hardware decoding as an example. Certainly, the present disclosure is not limited thereto.

As shown in FIG. 4, a super-resolution processing engine may obtain the texture data from the video frame. The texture data has the same resolution as the video frame. The texture data is structured data configured for describing color information of a video frame, and may be stored and used in a form of a data object that includes a plurality of images in a same image format. The plurality of images in the same image format are also referred to as texture images. The texture data may provide input of texture information to various shaders (for example, a vertex shader and a fragment shader), and may also be used as a rendering object. The texture data having the first resolution is structured data configured for describing color information of the video frame, and may include a plurality of first texture images in a same image format, where each first texture image has the first resolution.

According to the embodiments of the present disclosure, the texture data has a texture identifier configured for identifying the texture data. As described above, each video frame includes a plurality of pixels, and sizes, formats, and dimensions of the video frames are the same. To describe the video frames, the super-resolution processing engine extracts some images with specific constraints from the video frames as the texture images, and places the texture images into a container identified by the texture identifier. In addition, in an embodiment, the texture data further includes a texture type, a texture size, and an image format of the images with specific constraints. The texture type defines an arrangement manner of the texture image, the texture size defines a size of the texture image, and the image format limits a format of the texture image. Certainly, the present disclosure is not limited thereto.

In an example, a process of obtaining the texture data may be briefly described as follows: Firstly, the video frame is bound to a surface object (for example, for rendering), and a texture identifier (also referred to as a texture ID) is obtained based on a surface texture object corresponding to the surface object, the texture identifier being associated with the texture data having the first resolution; and the texture data having the first resolution is obtained based on the texture identifier. The surface object is a data structure that provides a canvas object to an application (for example, the video player) for subsequent video rendering and presentation, and maintains an image buffer object in the surface object for image display. The surface texture object is an object that combines the surface object and a texture object, and is configured to convert the one or more video frames (also referred to as an image stream) into the texture data, so that the texture data can be processed by hardware (for example, an OpenGL-based embedded system OpenGL ES). The OpenGL ES is mainly used as an example for description. However, a person skilled in the art is to understand that, the present disclosure is not limited thereto.

The OpenGL ES is a cross-platform 2D and 3D graphics application programming interface (API) with complete functions, and is mainly designed specifically for a plurality of embedded systems, including a console, a mobile phone, a handheld device, a home device, a car, and the like. The OpenGL ES is formed by a subset of OpenGL adapted for a desktop computer, and creates a flexible underlying interaction interface between software and graphics acceleration. The OpenGL ES includes system descriptions of floating-point arithmetic and fixed-point arithmetic and a native window system specification for a portable device.

Next, an example of a process in which the super-resolution processing engine obtains the texture data is further described with reference to FIG. 6. Certainly, the present disclosure is not limited thereto.

Operation S303: Generate, based on the texture data having the first resolution, texture data having second resolution, the second resolution being higher than the first resolution.

According to the method 30 in the embodiments of the present disclosure, the texture data having the second resolution may be generated by using various lightweight super-resolution algorithms. The lightweight super-resolution algorithms may depend on capabilities of software and hardware on the terminal to extract and process the texture data, and mainly depend on the GPU without consuming excessive computing resources of the CPU, to complete real-time conversion from low-definition texture data to high-definition texture data in a lightweight and efficient manner. The following provides lightweight super-resolution algorithms applicable to GPU processing in a form of an example. The super-resolution algorithms usually only perform linear transformation or nonlinear transformation on each pixel value in the texture data having the first resolution without depending on a neural network model. Certainly, a person skilled in the art is to understand that, the present disclosure is not limited thereto.

For example, the texture data having the second resolution may be generated in a manner of detecting and removing low-resolution signal distortion. Such a process is also referred to as an anti-aliasing process. Because the server 110 often uses a down-sampling algorithm in a process of compressing the raw video data, this may cause an apparent error in texture data having 2 to 3 pixels somewhere in the video frame, and cause some continuously changing line segments or color blocks to become discontinuous pixel points. In addition, the texture data having the first resolution may cause an edge of a diagonal edge in the texture data to have aliasing. To eliminate the foregoing impact, as shown in FIG. 4, a super-resolution processor in the super-resolution processing engine may detect erroneous pixel points in the texture data having the first resolution and a set of jagged pixel points at the edge of the diagonal edge, and perform sampling and blending on these pixel points with pixel points adjacent to these pixel points, to obtain the texture data having the second resolution.

As another example, master data having the second resolution may be generated by using an up-sampling algorithm and/or an interpolation algorithm, and a detail of the master data may be adjusted (for example, a part of pixels in the master data is adjusted by using the anti-aliasing process described above), to obtain the texture data having the second resolution. Considering a limitation of the terminal 120, the master data may be generated by using an algorithm with low computational load, such as sinc, lanczos, or deci 2pass. Certainly, the present disclosure is not limited thereto. As another example, in addition to adjusting the part of pixels in the master data by using the anti-aliasing process, the part of pixels in the master data may also be adjusted by using an algorithm based on multi-channel conjugate or multi-frame sub-pixels, to improve quality of the master data. Certainly, the present disclosure is not limited thereto.

As another example, gradient distribution in the texture data having the first resolution may be adjusted by using an additive gradient transform algorithm, to generate the texture data having the second resolution. Next, an example of a process in which gradient distribution in the texture data having the first resolution is adjusted by using the additive gradient transform algorithm is further described with reference to FIG. 7. Certainly, the present disclosure is not limited thereto.

Operation S304: Generate, based on the texture data having the second resolution, one or more video frames having the second resolution through a rendering operation.

Rendering is a process in which the terminal generates the video frame based on a model. The model is a description of a video frame that is strictly defined by using a language or a data structure, including information such as geometry, a viewpoint, texture, lighting, and a shadow. In the present disclosure, the rendering operation is completed by using the GPU of the terminal 120, to adapt to a real-time video scenario. The texture data having the second resolution may be used as data for describing a surface detail (including a surface color detail) in the foregoing model. The terminal 120 triggers, based on a vertical synchronization signal, a plurality of GPU units to render a picture in the video frame based on the texture data having the second resolution. The GPU units may sequentially perform operations such as vertex shading, shape assembly, geometry shading, rasterization, and fragment shading, to compute a red, green, and blue (RGB) value of each pixel in the video frame, thereby obtaining a video frame to be displayed by the terminal 120.

The vertical synchronization signal is a synchronization signal that the GPU on the terminal computes for a picture frame, and indicates an end of a previous frame and a start of a next frame. In other words, usually, a picture frame is rendered for a time interval between two adjacent vertical synchronization signals. Next, an example of a process of rendering the texture data having the second resolution by using a hardware environment of the terminal to obtain the one or more video frames is further described with reference to FIG. 8 to FIG. 9. Certainly, the present disclosure is not limited thereto.

In at least one embodiment of the present disclosure, operations S301 to S304 may be performed sequentially, may be performed in parallel, or may be performed in another adjusted sequence. An execution sequence of each operation is not limited in the embodiments of the present disclosure, and may be adjusted according to an actual situation. In at least one embodiment of the present disclosure, the method 30 may exemplarily perform some of operations S301 to S304, or may perform some additional operations other than operations S301 to S304. This is not limited in the embodiments of the present disclosure. For example, in some exemplary embodiments of the present disclosure, operation S305 is further exemplarily included. An example is provided: Operation S305: Display the one or more video frames having the second resolution. Specifically, the video frames may be displayed on the user interface shown in FIG. 2. This is not limited in the present disclosure.

Therefore, according to the embodiments of the present disclosure, a video is compressed on a server side, and a video with small data volume and low definition is delivered, thereby reducing a network transmission bandwidth, and improving efficiency of transmitting the video. In addition, when a terminal plays the video, picture quality of the video is enhanced, a lightweight super-resolution (SR) algorithm is used, so that picture quality of the video is enhanced, video storage costs of a mobile terminal are reduced, and a video viewing effect is ensured.

In addition, the present disclosure further provides an apparatus for processing video data, including: a receiving module, configured to receive compressed video data, the compressed video data having first resolution; an extraction module (for example, a module configured to extract the texture data shown in FIG. 4), configured to obtain, based on one or more video frames in the compressed video data, texture data having the first resolution; a super-resolution processing module (for example, a super-resolution processor in FIG. 4), configured to generate, based on the texture data having the first resolution, texture data having second resolution, the second resolution being higher than the first resolution; and a rendering module (for example, a module configured to render for displaying on a screen in FIG. 4), configured to generate, based on the texture data having the second resolution, one or more video frames having the second resolution through a rendering operation.

The apparatus for processing video data includes a processor and a display, where the display is configured to display a button configured for controlling resolution of the video data at a first moment; the processor is configured to generate, in response to that the button configured for controlling the resolution of the video data is triggered, the one or more video frames having the second resolution based on the one or more video frames in the compressed video data; and the display is further configured to display the one or more video frames having the second resolution at a second moment.

Next, some exemplary details of the method 30 for processing video data according to the embodiments of the present disclosure are further described with reference to FIG. 5 to FIG. 9.

Figure 5:
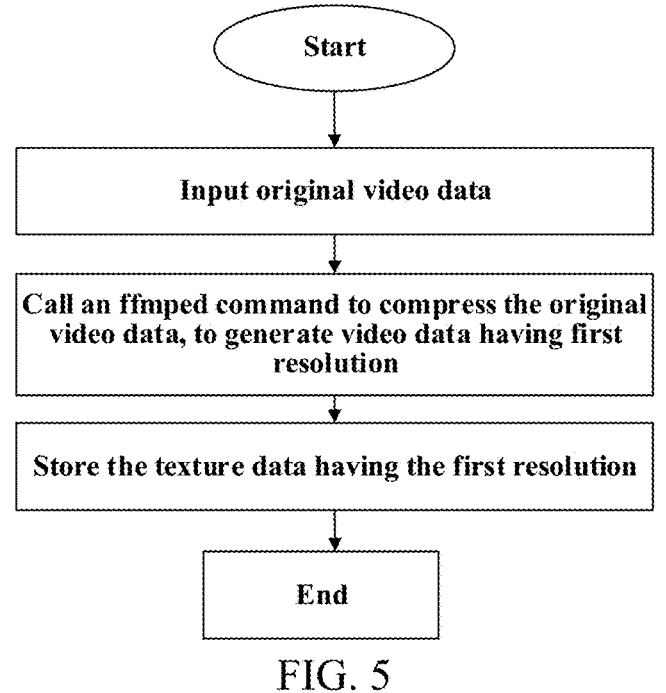
FIG. 5 is a schematic diagram showing a process of compressing original video data on a server according to an embodiment of the present disclosure.

FIG. 5 is a schematic diagram showing the process of compressing the original video data on the server according to an embodiment of the present disclosure.

The process in the embodiments of the present disclosure is a program having an independent function (a running activity related to a data set). The process is a basic unit of dynamic execution of an operating system. In the operating system, the process is both a basic allocation unit and a basic execution unit. The process may be a container, and usually includes a kernel object, address space, statistical information, and a plurality of threads. The process may not actually execute code instructions, but hand the code instructions to the thread in the process for execution.

The process in the embodiments of the present disclosure may call various compression tools to compress the raw video data. An ffmpeg tool is hereinafter used as an example for description. However, a person skilled in the art is to understand that, the present disclosure is not limited thereto. The ffmpeg is a type of open source software that can perform recording, conversion, and streaming functions on audio and videos in a plurality of formats. The ffmpeg integrates a decoder library that can be used in audio and videos of various items and a format conversion library for the audio and videos.

In an example, as shown in FIG. 5, after the server 110 receives high-definition original video data uploaded by a video publisher, the process of processing video data compression is woken up. A main thread in the process transfers the high-definition original video data to an origin.mp4 file, and calls an idle thread in a thread pool to enable the idle thread to execute an ffmpeg command (for example, ffmpeg-i origin.mp4-vf scale=1280:720 720P.mp4), to compress the high-definition original video data into video data having the first resolution (for example, 720P), and name a compressed video as 720P.mp4. Then, the thread returns the compressed video named 720P.mp4 to the main thread, so that the main thread can correspondingly store the compressed video, for example, to overwrite the raw video data. Next, after receiving a user request meeting a requirement, a process of processing the user request on the server 110 transmits the compressed video data to the corresponding terminal 120. Through the compression process shown in FIG. 5, 40% of data volume can be reduced, thereby reducing storage and network bandwidth costs. The foregoing process is merely an example. This is not limited in the present disclosure.

Figure 6:
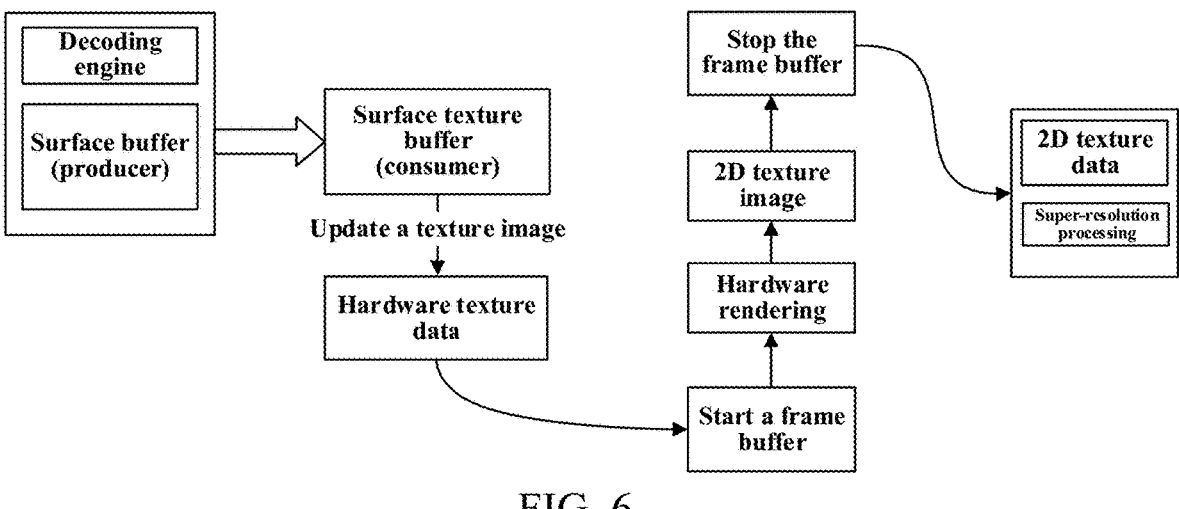
FIG. 6 is a schematic diagram showing obtaining texture data having first resolution according to an embodiment of the present disclosure.

FIG. 6 is a schematic diagram showing obtaining the texture data having the first resolution according to an embodiment of the present disclosure.

In an example of the present disclosure, the obtaining, based on one or more video frames in the compressed video data, texture data having the first resolution includes: binding the video frame to a surface object for rendering, and obtaining a texture identifier based on a surface texture object corresponding to the surface object; and obtaining, based on the texture identifier, the texture data having the first resolution. The obtaining, based on the texture identifier, the texture data having the first resolution further includes: creating a frame buffer object, and binding two-frames from the shared storage area and stores the video frames in the surface texture object buffer, and converts the video frames into the texture images to obtain the hardware texture data. The hardware texture data may be texture data of a TEXTURE_EXTERNAL_OES type, and may be directly processed by an opengl-based embedded system. Certainly, the present disclosure is not limited thereto.

Then, the super-resolution processing engine renders the hardware texture data into the two-dimensional texture data through a pipeline operation. As shown in FIG. 6, such a process may include the following operations: First, a frame buffer object (FBO) mFrameBuffer is created, and the two-dimensional texture data (also denoted as Texture2D) is used as a color buffer of the frame buffer object mFrameBuffer. Next, before hardware rendering, the frame buffer object is set to an activated frame buffer object mFrameBuffer, so that the hardware texture data is sampled into the frame buffer object mFrameBuffer. Because the frame buffer object mFrameBuffer uses the two-dimensional texture data as the color buffer, the frame buffer object mFrameBuffer can sample the hardware texture data into a two-dimensional texture image. After the frame buffer object mFrameBuffer is deactivated, the two-dimensional texture data including the two-dimensional texture image is obtained for super-resolution processing. The process samples the hardware texture data indirectly onto the two-dimensional texture data through the pipeline, to obtain required texture data.

The foregoing process may be summarized by using the following pseudocode. Certainly, the present disclosure is not limited thereto.

```
*****************************************************************
GLES30. glBindFramebuffer (GLES30. GL_FRAMEBUFFER, mFrameBuffer)
GLES30.glFramebufferTexture2D
    GLES30. GL_FRAMEBUFFER,
    GLES30. GL_COLOR_ATTACHMENT0,
    GLES30. GL_TEXTURE_2D,
    texture2D
    0
    )
GLES30. glBindFramebuffer (GLES30. GL_FRAMEBUFFER, 0)
*****************************************************************
``` dimensional texture data to the frame buffer object, to use the two-dimensional texture data as a color buffer of the frame buffer object; and activating the frame buffer object, and sampling, based on the texture identifier, hardware texture data outputted by the graphics processing unit of the terminal into the two-dimensional texture data, to use the two-dimensional texture data as the texture data having the first resolution. Certainly, the present disclosure is not limited thereto.

As shown in FIG. 6, a surface object is built in the super-resolution processing engine, to obtain the one or more video frames and write the one or more video frames to a buffer queue (for example, a BufferQueue). Assuming that the decoding engine is the MediaCodec, the MediaCode supports directly inputting the one or more video frames into the surface object. A buffer queue in the surface object serves as a producer, and a surface texture object buffer (SurfaceTexture Buffer) serves as a consumer. The buffer queue and the surface texture object buffer communicates based on a producer-consumer model, and jointly process a video frame in a limited shared storage area. For example, a buffer object in the surface object may sequentially add the video frames to the shared storage area based on a first-in-first-out principle; and the surface texture object extracts the video The function GLES30. glBindFramebuffer (GLES30. GL_FRAMEBUFFER, mFrameBuffer) binds the frame buffer object mFrameBuffer to a target frame buffer object GLES30. GL_FRAMEBUFFER in the hardware environment, so that the hardware texture data is sampled into the frame buffer. The function GLES30.glFramebufferTexture2D ( . . . ) uses the two-dimensional texture data as the color buffer of the frame buffer object, so that the frame buffer object mFrameBuffer can sample the hardware texture data into the two-dimensional texture image. The function GLES30.glBindFramebuffer (GLES30.GL_FRAMEBUFFER, 0) deactivates the frame buffer object mFrameBuffer.

The foregoing process of obtaining the texture data implements rendering of the video frame to an externally set two-dimensional texture object, to implement decoupling between the texture data and the video frame, and provide an operable object decoupled from another module of the video player for subsequent application of the super-resolution algorithm, thereby reducing computational complexity of the video player.

Figure 7:
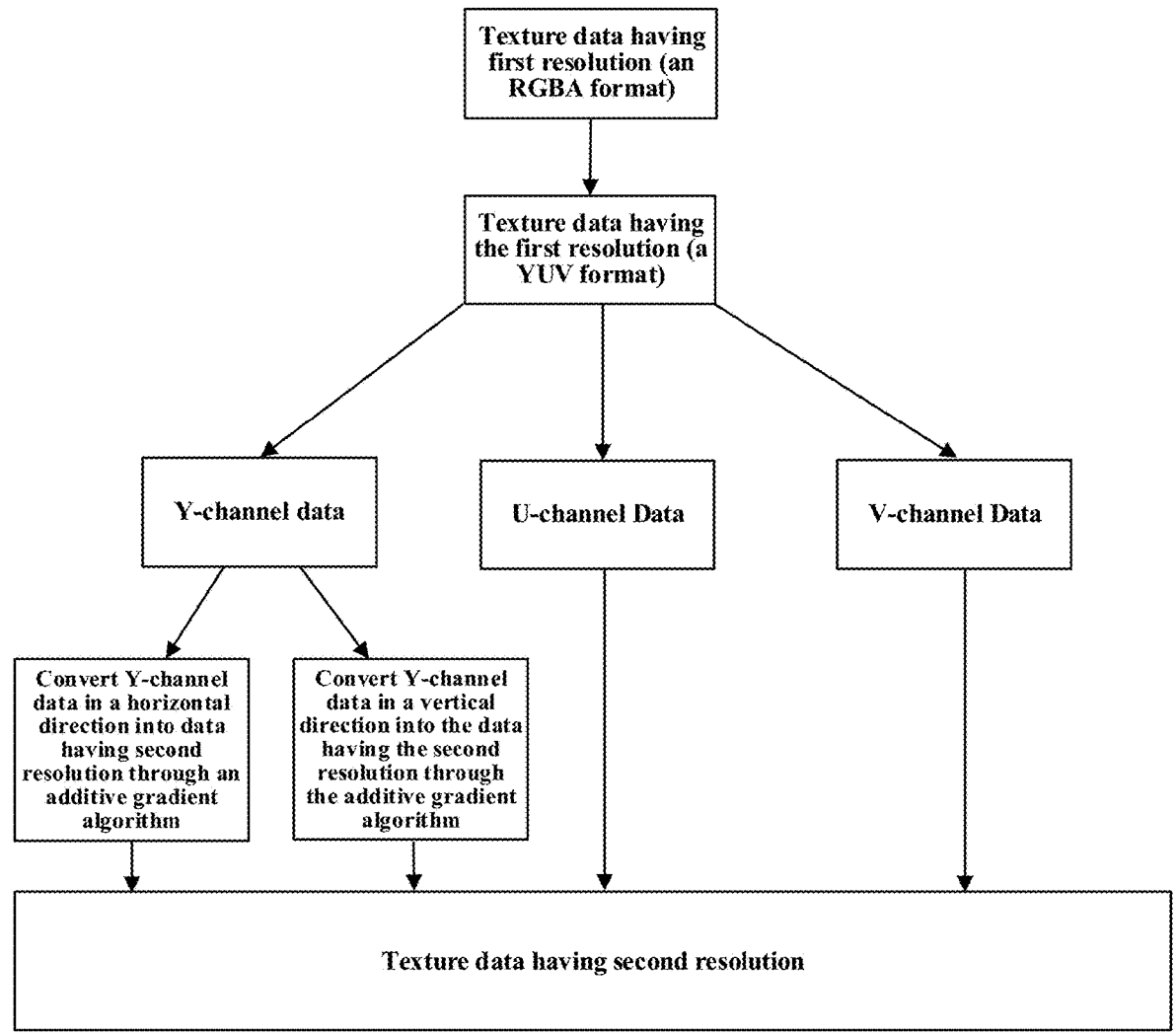
FIG. 7 is a schematic diagram showing obtaining texture data having second resolution according to an embodiment of the present disclosure.

FIG. 7 is a schematic diagram showing obtaining the texture data having the second resolution according to an embodiment of the present disclosure.

In an example of the present disclosure, in operation S303, the generating, based on the texture data having the first resolution, texture data having second resolution includes: converting an image format of the texture data having the first resolution from an RGBA format (a first color model format) to a YUV format (a second color model format), to extract Y-channel data (luma component channel data) corresponding to the texture data having the first resolution; processing the Y-channel data by using an additive gradient algorithm, to generate Y-channel data having the second resolution; and generating, based on the Y-channel data having the second resolution, the texture data having the second resolution. Certainly, the present disclosure is not limited thereto.

As shown in FIG. 7, it is assumed that the texture data having the first resolution has width pixels at a long edge and height pixels at a short edge. Width and height are both positive integers. The texture data having the first resolution is usually in the RGBA format. The RGBA is a color space model, and is formed by RGB color space and an Alpha channel. The RGBA represents red, green, blue, and the Alpha channel. To further reduce the computational load, the texture data having the first resolution may be first converted to the YUV format. The YUV is another model for representing a color. Y refers to a luma component (namely, the Y-channel data), U refers to a blue chroma component (namely, U-channel data), and V refers to a red chroma component (namely, V-channel data).

Because sensitivity of human eyes to the Y-channel data far exceeds sensitivity to the U-channel data and the V-channel data, to further reduce the computational complexity, only the Y-channel data may be processed, to adjust a detail in the Y-channel data, thereby generating the Y-channel data having the second resolution. Next, fusion is performed on the Y-channel data having the second resolution, U-channel data having the first resolution, and V-channel data having the first resolution, to generate the texture data having the second resolution.

Specifically, in an example of the present disclosure, in operation S303, the generating, based on the texture data having the first resolution, texture data having second resolution includes: generating, based on the Y-channel data having the second resolution, Y-channel data in a horizontal direction (also referred to as "horizontal Y-channel data") and Y-channel data in a vertical direction (also referred to as "vertical Y-channel data"); processing the Y-channel data in the horizontal direction and the Y-channel data in the vertical direction by using the additive gradient algorithm, to generate Y-channel data having the second resolution in the horizontal direction and Y-channel data having the second resolution in the vertical direction; generating, based on the Y-channel data having the second resolution in the horizontal direction and the Y-channel data having the second resolution in the vertical direction, the Y-channel data having the second resolution; and generating, based on the Y-channel data having the second resolution, the texture data having the second resolution.

In an example, a process of applying the additive gradient algorithm to the Y-channel data (or the Y-channel data in the horizontal direction or the Y-channel data in the vertical direction) may be briefly described as follows: First, a ratio r between a gradient profile $p_1=\{\lambda_1, \sigma_1\}$ of Y-channel data having the first resolution and a gradient profile $p_2=\{\lambda_2, \sigma_2\}$ of the Y-channel data having the second resolution is computed. The gradient profile is a one-dimensional profile in a gradient direction of a zero-crossing pixel in an image (for example, the Y-channel data having the first resolution), and may be represented by two parameters, namely, a shape parameter $\lambda$ and profile sharpness $\sigma$. The shape parameter $\lambda$ is a parameter for controlling an overall shape of a gradient of the image, and the profile sharpness $\sigma$ is a parameter for controlling sharpness of the gradient profile. Lower profile sharpness $\sigma$ indicates higher sharpness of the gradient profile. Then, based on the ratio, a gradient field of the Y-channel data having the first resolution is converted to a gradient field of the Y-channel data having the second resolution, to obtain the Y-channel data having the second resolution. Certainly, the present disclosure is not limited thereto.

In the foregoing process, the ratio r may be computed in advance before applying the additive gradient algorithm, so that the super-resolution processing engine only needs to perform simple linear computation on each pixel in the Y-channel data having the first resolution in an entire process, so that a value of each pixel in the Y-channel data having the second resolution can be obtained. The entire process does not need participation of a neural network, which is lightweight and efficient, so that the computational load of the terminal can be significantly reduced.

Figure 8:
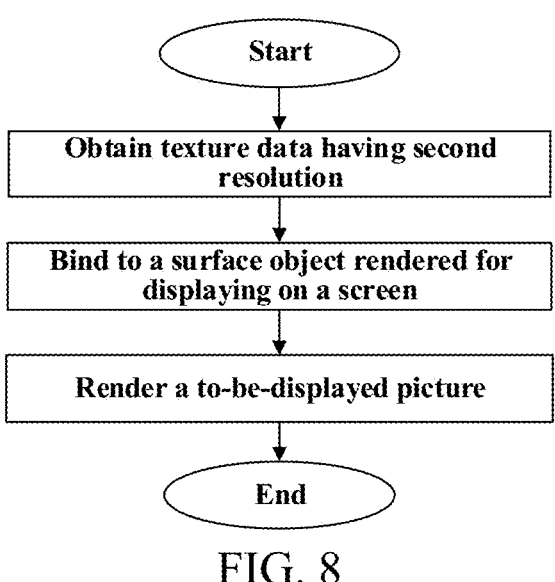
FIG. 8 is a schematic diagram showing generating, based on texture data having second resolution, one or more video frames having the second resolution according to an embodiment of the present disclosure.
Figure 9:
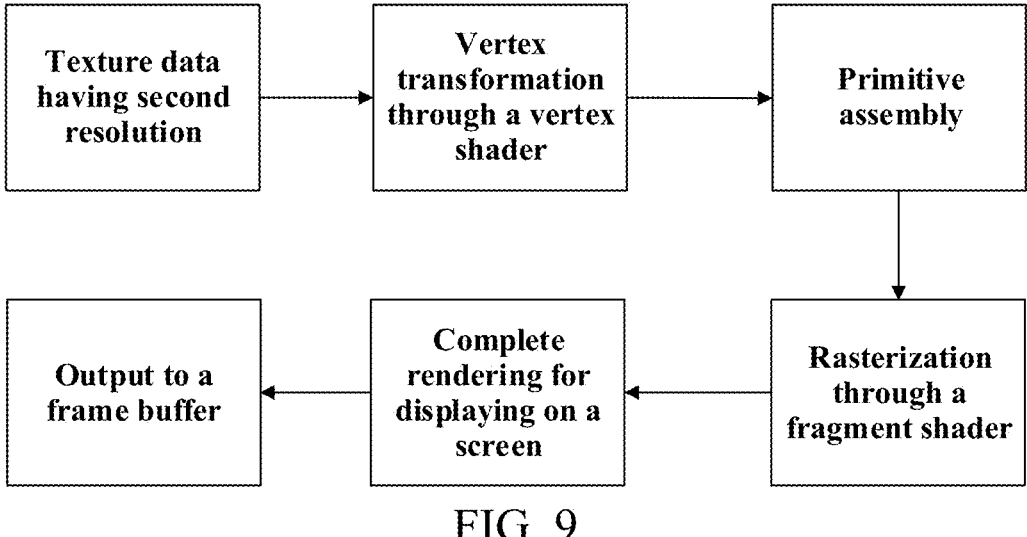
FIG. 9 is a schematic diagram showing a rendering operation according to an embodiment of the present disclosure.

FIG. 8 is a schematic diagram showing generating, based on the texture data having the second resolution, the one or more video frames having the second resolution according to an embodiment of the present disclosure. FIG. 9 is a schematic diagram showing the rendering operation according to an embodiment of the present disclosure.

In an example of the present disclosure, in operation S304, the generating, based on the texture data having the second resolution, one or more video frames having the second resolution through a rendering operation includes: binding, based on a registration callback function corresponding to the surface texture object, the texture data having the second resolution to a surface object outputting the video frame; and generating, based on the surface object bound with the texture data having the second resolution, the one or more video frames having the second resolution through the rendering operation. Certainly, the present disclosure is not limited thereto.

As shown in FIG. 8, the hardware environment of the terminal 120 first needs to obtain the texture data having the second resolution generated in operation S303. Referring to FIG. 6, an exemplary process of obtaining the texture data having the second resolution may be briefly described as follows: First, the registration callback function is set for the surface texture object (SurfaceTexture). The registration callback function calls a function by using a function pointer, and transfers the function pointer as a parameter to decouple a caller and a callee, to avoid a processing situation in which a thread is separately established to determine the texture data. For example, a function setOnFrameAvailableListener may be used, so that the surface texture object can listen to decoded texture data having the first resolution, and directly obtain the texture data having the second resolution by using the registration callback function. Because operation S303 is decoupled from a native operation in the video player Mediacodc, the texture data having the second resolution cannot be directly rendered by using the Mediacodc. Therefore, the rendering operation (as shown in FIG. 9) specific to the texture data having the second resolution needs to be designed, to bind the texture data having the second resolution to the surface object outputting the video frames, and render the video frames having the second resolution.

As shown in FIG. 9, in an example of the present disclosure, in operation S304, the generating one or more video frames having the second resolution through a rendering operation includes: sequentially performing a vertex transformation operation, a primitive assembly operation, and a rasterization operation on the texture data having the second resolution, to generate the one or more video frames having the second resolution.

```
*****************************************************************
public static final String DEFAULT_FRAGMENT_OES_SHADER = ""
    + "#extension GL_OES_EGL_image_external:require \n"    +
"precision mediump float;\n"
    + "uniform samplerExternalOES vTexture;\n"
    + "varying vec2 v_TexCoordinate;\n"
    + "void main ( ) {\n"
    ++ "  vec4 color = texture2D(vTexture, v_TexCoordinate);\n"
    + "  gl_FragColor = color;\n"
    + "}";
*****************************************************************
```

First, vertex transformation is performed on the texture data having the second resolution by using a vertex shader. Specifically, graphics in all video frames are a string of data in a computer, and may be represented as an N*3 matrix in a three-dimensional coordinate system. N is a quantity of vertices, and 3 respectively represents position coordinates of x, y, and z. Vertex transformation is to perform an operation such as translation, reduction, magnification, or rotation on the vertex in the coordinate system through a series of matrix transformations. The vertex shader is vertex shader source code/an executable file that is configured for describing model transformation, visual transformation, projection transformation, and lighting processing required to be performed on the vertex. In an example, the foregoing process may be summarized by using the following pseudocode. Certainly, the present disclosure is not limited thereto.

```
*****************************************************************
public static final String DEFAULT_VERTEX_COMMON_SHADER = "attribute vec4
vPosition;\n"
    +"attribute vec4 vTexCoordinate;\n"
    +"varying vec2 v_TexCoordinate; \n"
    +"void main ( ) {\n"
    +"  v_TexCoordinate = vTexCoordinate.xy;\n"
    +"  gl_Position = vPosition;\n"
    +"}";
*****************************************************************
```

Then, primitive assembly may be performed on the texture data (having the second resolution) after vertex transformation by using a primitive assembler. The primitive assembly operation enables the terminal to connect the vertices after matrix transmission. For example, it is assumed that three points after vertex transformation may be determined whether the three points are drawn into a triangle or two straight lines after the primitive assembly operation.

Next, rasterization may be performed on the texture data after primitive assembly by using a fragment shader. The fragment shader is fragment shader source code/an executable file that is configured for describing an operation (for example, color blending) performed on a fragment. The rasterization operation can perform color rendering or texture rendering on a primitive. The primitive after rasterization can be visible after being outputted to the frame buffer. In other words, based on the rasterization operation, coordinates of the graphic are converted to screen pixel coordinates, to finally convert a mathematical description of the primitive to a fragment for displaying on a screen, and the video frame can be displayed on the screen through the frame buffer. In an example, the foregoing process may be summarized by using the following pseudocode. Certainly, the present disclosure is not limited thereto.

In the process, the foregoing operations are performed on the texture data having the second resolution to render for displaying on the screen, which resolves a problem that the texture data processed through the super-resolution processing engine cannot be directly processed by the video player. In addition, the rendering operation is implemented through each GPU unit at a low computing resource, further reducing computing costs of the terminal.

In the foregoing method, the method may further include: displaying a button configured for controlling resolution of the video data; generating, in response to that the button configured for controlling the resolution of the video data is triggered, the one or more video frames having the second resolution based on the one or more video frames in the compressed video data; and displaying the one or more video frames having the second resolution.

Exemplary embodiments of this application may be formed by using any combination of all the foregoing exemplary technical solutions. Details are not described herein again.

Figure 10:
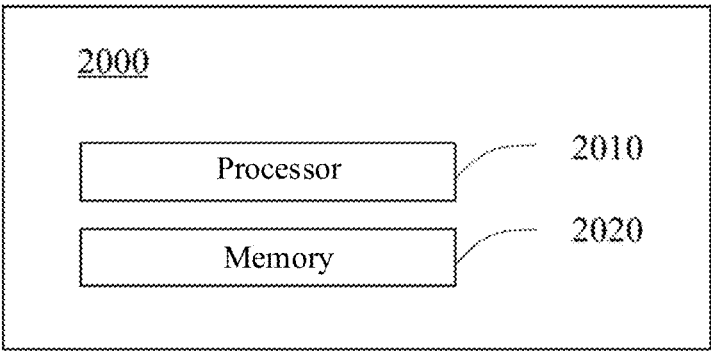
FIG. 10 is a schematic diagram of an electronic device according to an embodiment of the present disclosure.

According to another aspect of the present disclosure, an electronic device configured to implement the method according to the embodiments of the present disclosure is further provided. FIG. 10 is a schematic diagram of an electronic device 2000 according to an embodiment of the present disclosure.

As shown in FIG. 10, the electronic device 2000 may include: one or more processors 2010 and one or more memories 2020. The one or more memories 2020 have one or more computer-readable codes stored therein, and the one or more computer-readable codes, when run by the one or more processors 2010, may perform the method described above.

The processor in the embodiments of the present disclosure may be an integrated circuit chip, and has a signal processing capability. The processor may be a general purpose processor, a digital signal processor (DSP), an application-specific integrated circuit (ASIC), a field programmable gate array (FPGA), or another programmable logical device, a discrete gate or transistor logical device, or a discrete hardware component. The processor may implement or perform methods, operations and logical block diagrams disclosed in the embodiments of the present disclosure. The general purpose processor may be a microprocessor or the processor may be any conventional processor or the like, and the processor may be an X86 architecture or an ARM architecture.

Generally, the exemplary embodiments of the present disclosure may be implemented in hardware or a dedicated circuit, software, firmware, logic, or any combination thereof. Some aspects may be implemented in hardware, while other aspects may be implemented in firmware or software that may be executed by a controller, a microprocessor, or another computing device. When aspects of the embodiments of the present disclosure are illustrated or described as block diagrams, flowcharts, or using some other graphical representations, the blocks, apparatuses, systems, techniques, or methods described herein may be implemented in, as non-limiting examples, the hardware, software, firmware, dedicated circuit or logic, general-purpose hardware or controller or another computing device, or some combination thereof.

Figure 11:
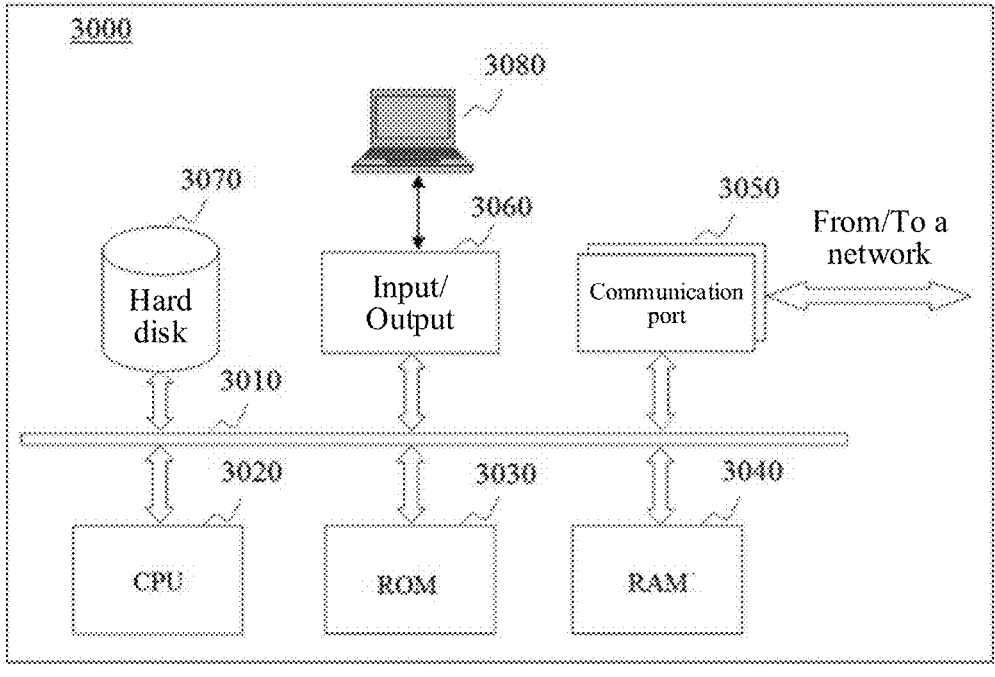
FIG. 11 is a schematic diagram showing an architecture of an exemplary computing device according to an embodiment of the present disclosure.

For example, the method or apparatus according to the embodiments of the present disclosure may also be implemented by using an architecture of a computing device 3000 shown in FIG. 11. As shown in FIG. 11, the computing device 3000 may include a bus 3010, one or more CPUs 3020, a read-only memory (ROM) 3030, a random access memory (RAM) 3040, a communication port 3050 connected to a network, an input/output component 3060, a hard disk 3070, and the like. A storage device in the computing device 3000 such as the ROM 3030 or the hard disk 3070 may store various data or files for processing and/or communication in the method provided by the present disclosure and program instructions executed by the CPU. The computing device 3000 may further include a user interface 3080. Certainly, the architecture shown in FIG. 11 is merely an example. When implementing different devices, one or more components in the computing device shown in FIG. 11 may be omitted according to an actual need.

Figure 12:
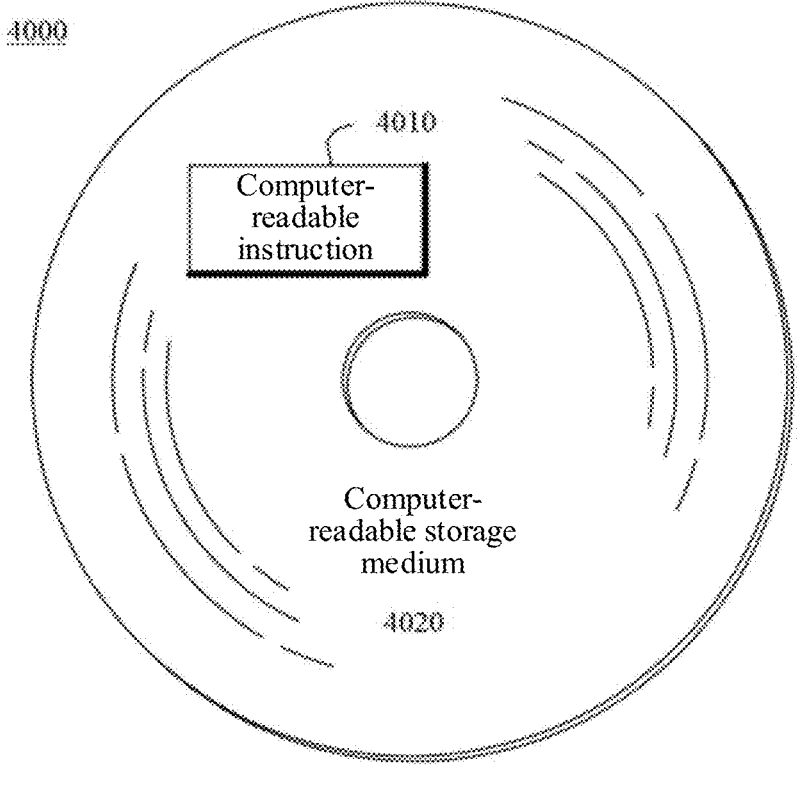
FIG. 12 is a schematic diagram of a storage medium according to an embodiment of the present disclosure.

According to another aspect of the present disclosure, a computer-readable storage medium is further provided. FIG. 12 is a schematic diagram of a storage medium 4000 according to the present disclosure.

As shown in FIG. 12, a computer-readable storage medium 4020 has computer-readable instructions 4010 stored therein. The computer-readable instructions 4010, when run by a processor, may perform the method according to the embodiments of the present disclosure described with reference to the foregoing accompanying drawings. The computer-readable storage medium in the embodiments of the present disclosure may be a volatile memory or a non-volatile memory, or may include both a volatile memory and a non-volatile memory. The non-volatile memory may include a read-only memory (ROM), a programmable read-only memory (PROM), an erasable programmable read-only memory (EPROM), an electrically erasable programmable read-only memory (EEPRO) or a flash memory. The volatile memory may include a random access memory (RAM), and serves as an external cache. Through illustrative but not limited description, RAMs in many forms, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM), are available. The memory of the method described herein is intended to include, but is not limited to, these and any other suitable types of memories. The memory of the method described herein is intended to include, but is not limited to, these and any other suitable types of memories.

According to an embodiment of the present disclosure, a computer program product or a computer program is further provided, including computer instructions, the computer instructions being stored in a computer-readable storage medium. A processor of a computer device reads the computer instructions from the computer-readable storage medium, and executes the computer instructions, to enable the computer device to perform the method according to the embodiments of the present disclosure.

Flowcharts and block diagrams in the accompanying drawings illustrate possible system architectures, functions and operations that may be implemented by systems, methods, and computer program products according to the embodiments of the present disclosure. In this regard, each box in a flowchart or a block diagram may represent a module, a program segment, or a part of code. The module, the program segment, or the part of code includes one or more executable instructions configured for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and computer instructions.

Generally, the exemplary embodiments of the present disclosure may be implemented in hardware or a dedicated circuit, software, firmware, logic, or any combination thereof. Some aspects may be implemented in hardware, while other aspects may be implemented in firmware or software that may be executed by a controller, a microprocessor, or another computing device. When aspects of the embodiments of the present disclosure are illustrated or described as block diagrams, flowcharts, or using some other graphical representations, the blocks, apparatuses, systems, techniques, or methods described herein may be implemented in, as non-limiting examples, the hardware, software, firmware, dedicated circuit or logic, general-purpose hardware or controller or another computing device, or some combination thereof.

The exemplary embodiments of the present disclosure described in detail above are merely illustrative and are not intended to be limiting. A person skilled in the art is to understand that, various modifications and combination may be made to the embodiments or features thereof without departing from the principle and spirit of the present disclosure. The modifications are to fall within the scope of the present disclosure.

What is claimed is:

1. A video data processing method comprising:
receiving compressed video data, the compressed video data having first resolution;
binding one or more first video frames in the compressed video data to a surface object for rendering;
obtaining a texture identifier based on a surface texture object corresponding to the surface object;
obtaining, based on the texture identifier, first texture data having the first resolution;
generating, based on the first texture data, second texture data having second resolution, the second resolution being higher than the first resolution; and
generating, through a rendering operation and based on the second texture data, one or more second video frames having the second resolution.

2. The method according to claim 1, further comprising:
decapsulating the compressed video data into a video bitstream by using a central processing unit of a terminal; and
decoding the video bitstream to obtain the one or more first video frames by using a graphics processing unit of the terminal;
wherein the first texture data is obtained by using the graphics processing unit of the terminal.

3. The method according to claim 1, wherein:
each of the first texture data and the second texture data includes structured data configured to describe color information of a video frame;
the first texture data includes a plurality of first texture images in a same image format and each having the first resolution; and
the second texture data includes a plurality of second texture images in a same image format and each having the second resolution.

4. The method according to claim 1, wherein obtaining, based on the texture identifier, the first texture data includes:
creating a frame buffer object;
binding two-dimensional texture data to the frame buffer object, to use the two-dimensional texture data as a color buffer of the frame buffer object;
activating the frame buffer object; and
sampling, based on the texture identifier, hardware texture data outputted by a graphics processing unit of a terminal into the two-dimensional texture data, to use the two-dimensional texture data as the first texture data.

5. The method according to claim 1, wherein generating the one or more second video frames includes:
binding, based on a registration callback function corresponding to the surface texture object, the second texture data to the surface object outputting the one or more first video frames; and
generating, through the rendering operation and based on the surface object, the one or more second video frames.

6. The method according to claim 1, wherein generating the second texture data includes:
converting an image format of the first texture data from a first color model format to a second color model format, to extract first luma component channel data corresponding to the first texture data;
processing the first luma component channel data using an additive gradient algorithm, to generate second luma component channel data having the second resolution; and
generating, based on the second luma component channel data, the second texture data having the second resolution.

7. The method according to claim 6, wherein generating, based on the second luma component channel data, the second texture data includes:
generating, based on second the luma component channel data, first horizontal luma component channel data and first vertical luma component channel data;
processing the first horizontal luma component channel data and the first vertical luma component channel data using the additive gradient algorithm, to generate second horizontal luma component channel data having the second resolution and second vertical luma component channel data having the second resolution;
generating, based on the second horizontal luma component channel data and the second vertical luma component channel data, the second luma component channel data; and
generating, based on the second luma component channel data, the second texture data.

8. The method according to claim 1, wherein generating the one or more second video frames includes:
sequentially performing a vertex transformation operation, a primitive assembly operation, and a rasterization operation on the second texture data, to generate the one or more second video frames.

9. The method according to claim 1, further comprising:
displaying the one or more second video frames on a display of a terminal.

10. The method according to claim 1, further comprising:
displaying a button configured to control resolution;
generating, in response to the button being triggered, the one or more second video frames based on the one or more first video frames; and
displaying the one or more second video frames.

11. A computer device comprising:
one or more processors; and
one or more memories storing one or more computer-executable programs that, when executed by the one or more processors, cause the computer device to:
receive compressed video data, the compressed video data having first resolution;
bind one or more first video frames in the compressed video data to a surface object for rendering;
obtain a texture identifier based on a surface texture object corresponding to the surface object;
obtain, based on the texture identifier, first texture data having the first resolution;
generate, based on the first texture data, second texture data having second resolution, the second resolution being higher than the first resolution; and
generate, through a rendering operation and based on the second texture data, one or more second video frames having the second resolution.

12. The computer device according to claim 11, wherein:
the one or more processors include a central processing unit and a graphics processing unit; and
the one or more computer-executable programs, when causing the computer device to obtain the first texture data:

cause the central processing unit to decapsulate the compressed video data into a video bitstream;

cause the graphics processing unit to decode the video bitstream to obtain the one or more first video frames; and cause the graphics processing unit to obtain, based on the one or more first video frames, the first texture data.

13. The computer device according to claim 11, wherein:

each of the first texture data and the second texture data includes structured data configured to describe color information of a video frame;

the first texture data includes a plurality of first texture images in a same image format and each having the first resolution; and the second texture data includes a plurality of second texture images in a same image format and each having the second resolution.

14. The computer device according to claim 11, wherein the one or more computer-executable programs, when executed by the one or more processors, further cause the computer device to, when obtaining, based on the texture identifier, the first texture data:

create a frame buffer object;

bind two-dimensional texture data to the frame buffer object, to use the two-dimensional texture data as a color buffer of the frame buffer object;

activate the frame buffer object; and sample, based on the texture identifier, hardware texture data outputted by a graphics processing unit of the computer device into the two-dimensional texture data, to use the two-dimensional texture data as the first texture data.

15. The computer device according to claim 11, wherein the one or more computer-executable programs, when executed by the one or more processors, further cause the computer device to, when generating the one or more second video frames:

bind, based on a registration callback function corresponding to the surface texture object, the second texture data to the surface object outputting the one or more first video frames; and generate, through the rendering operation and based on the surface object, the one or more second video frames.

16. The computer device according to claim 11, wherein the one or more computer-executable programs, when executed by the one or more processors, further cause the computer device to, when generating the second texture data:

convert an image format of the first texture data from a first color model format to a second color model format, to extract first luma component channel data corresponding to the first texture data;

process the first luma component channel data using an additive gradient algorithm, to generate second luma component channel data having the second resolution; and generate, based on the second luma component channel data, the second texture data having the second resolution.

17. The computer device according to claim 16, wherein the one or more computer-executable programs, when executed by the one or more processors, further cause the computer device to, when generating, based on the second luma component channel data, the second texture data:

generate, based on second the luma component channel data, first horizontal luma component channel data and first vertical luma component channel data;

process the first horizontal luma component channel data and the first vertical luma component channel data using the additive gradient algorithm, to generate second horizontal luma component channel data having the second resolution and second vertical luma component channel data having the second resolution;

generate, based on the second horizontal luma component channel data and the second vertical luma component channel data, the second luma component channel data; and generate, based on the second luma component channel data, the second texture data.

18. A non-transitory computer-readable storage medium storing one or more computer-executable instructions that, when executed by one or more processors of a computer device, cause the computer device to:

receive compressed video data, the compressed video data having first resolution;

bind one or more first video frames in the compressed video data to a surface object for rendering;

obtain a texture identifier based on a surface texture object corresponding to the surface object;

obtain, based on the texture identifier, first texture data having the first resolution;

generate, based on the first texture data, second texture data having second resolution, the second resolution being higher than the first resolution; and generate, through a rendering operation and based on the second texture data, one or more second video frames having the second resolution.

* * * * *